United States Patent [19]

Sakaida et al.

[11] Patent Number: 4,783,041
[45] Date of Patent: Nov. 8, 1988

[54] MOLD FOR MOLDING OPTICAL DISC

[75] Inventors: Toshiaki Sakaida, Shiojiri; Yoshihiko Yuzawa, Ebina; Fumio Iriko, Tokyo; Fumio Kagawa, Kasukabe, all of Japan

[73] Assignees: Showa Denko Kabushiki Kaisha; Matsushita Electric Industrial Co., Ltd., both of Japan

[21] Appl. No.: 11,205

[22] Filed: Feb. 4, 1987

[30] Foreign Application Priority Data

Feb. 5, 1986 [JP] Japan .................................. 61-23594

[51] Int. Cl.$^4$ ............................................. B29C 33/38
[52] U.S. Cl. .................................... 249/103; 249/111; 249/112; 249/114; 249/134; 264/338; 425/190; 425/810
[58] Field of Search .................... 249/57, 80, 102–104, 249/111, 112, 114–116, 134, 135; 425/190, 191, 193, 195, 808, 810; 264/337, 338

[56] References Cited

U.S. PATENT DOCUMENTS

| 3,734,449 | 5/1973 | Itou et al. | 249/134 |
| 4,120,930 | 10/1978 | Lemelson | 249/114 |
| 4,225,109 | 9/1980 | Yotsutsuji et al. | 249/135 |
| 4,614,630 | 9/1986 | Pluim, Jr. | 249/114 |

FOREIGN PATENT DOCUMENTS

| 0121929 | 10/1984 | European Pat. Off. | |
| 0137246 | 4/1985 | European Pat. Off. | 249/135 |
| 1087400 | 10/1967 | United Kingdom . | |

Primary Examiner—Jay H. Woo
Assistant Examiner—James C. Housel
Attorney, Agent, or Firm—Darby & Darby

[57] ABSTRACT

A mold for molding an optical disc includes a first mold member having a recess, and a second mold having a body and a plate-like sintered ceramic member secured to the body and having a flat seat surface. The recess and the flat seat surface jointly provides a mold cavity when the first and second mold members are mated together. A disc-shaped thin stamper is adapted to be seated on and detachably secured to the flat seat surface. The ceramic member is made of a ceramic material having Rockwell hardness (A-Scale) of not less than 90, so that the flat seat surface is not subjected to undue damage for a prolonged period of time.

8 Claims, 1 Drawing Sheet

4,783,041

MOLD FOR MOLDING OPTICAL DISC

BACKGROUND OF THE INVENTION

1. Field of the Invention

This invention relates to a mold for molding an optical disc such as a compact disc and a laser disc.

2. Prior Art

In recent years, there have been increasingly used compact discs which store digital audio data and reproduce the recorded sound with high accuracy. As is well known in the art, a large number of fine pits are formed in a selected pattern in a surface of the compact disc so as to produce digital audio signals when they are detected, thereby reproducing the recorded music or other sounds. Generally, such an optical disc is injection molded using a disc-shaped thin stamper secured at one face to a mold and having a large number of fine projections corresponding in shape and size to the pits of the resultant optical disc. One such a conventional mold 10a as shown in FIG. 1 comprises a stationary mold member 12a having a recess 16a, and a movable mold member 14a movable toward and away from the stationary mold member 12a. The movable mold member 14a has a projection 22a formed on one face 24a thereof and adapted to be fitted in the recess 16a of the stationary mold member 12a when the two mold members 12a and 14a are mated together. The projection 22a has a flat seat surface 32a machined to a mirror surface. With this construction, when the stationary and movable mold members 12a and 14a are mated together, a mold cavity 30a is defined by the surface of the recess 16a of the stationary mold member 12a and the flat seat surface 32a as shown in FIG. 1. A disc-shaped stamper 34a having a thickness of about 0.3 mm is detachably secured to the seat surface 32a of the projection 22a by a bolt (not shown) received in a central hole 26a of the movable mold member 14a. A molding material is injected from a injection molding machine 36 into the mold cavity 30a via a nozzle 38a mounted on the stationary mold member 12a so as to mold a compact disc. The stationary and movable mold members 12a and 14a are made of steel such as one manufactured and sold by Uddeholm under the tradename of Stavax. Holes 40a and 42a fare formed in the stationary and movable mold members 12a and 14a, respectively, for passing cooling water therethrough.

Usually, various kinds of stampers are provided for being exchangeably mounted on the flat seat surface 32a of the movable mold member 14a so as to produce various kinds of compact discs. With this conventional mold 10a, however, if a jig or other tool inadvertently hits against the flat seat surface 32a of the movable mold member 14a at the time of exchaning the stampers 34a and at other occasions, the seat surface 32a is damaged. As a result, the thin stamper 34aseated on the damaged seat surface 32a is deformed at the damaged portion of the seat surface 32a, so that such deformation is transferred to the molded optical discs. Thus, there is a possibility that the optical discs of an inferior quality are produced in a large quantity. And, when the flat seat surface 32a of the movable mold member 14a is damaged, the damage seat surface 32a must be polished, which leads to low productivity.

In addition, when the molding resin is injected into the mold cavity 30a, the stamper 34a is subjected to vibration by the molding resin under pressure, so that the marginal portion of the flat seat surface 32a tends to undergo damage. This is undesirable since the stamper 34a is not held in proper position with respect to the flat seat surface 32a.

SUMMARY OF THE INVENTION

It is therefore an object of this invention to provide a mold for molding an optical disc in which a flat seat surface for holding a stamper thereon is less liable to damage.

According to the present invention, there is provided a mold for molding an optical disc comprising a first mold member having a first cavity surface and a second mold member movable relative to said first movable member and having a second cavity surface, the first and second cavity surfaces jointly providing a mold cavity when the first and second mold members are mated together, the second cavity surface having a flat seat surface for detachably holding a disc-shaped thin stamper thereon, the flat seat surface being made of a sintered ceramic material having Rockwell hardness (A-Scale) of not less than 90.

The flat seat surface is sufficently hard that it is not subjected to undue to damage even if the flat seat surface is inadvertently hit by a jig for exchanging the stamper so as to prevent the stamper from being deformed when it is mounted on the flat seat surface, thereby ensuring the molding of optical disc of a good quality for a prolonged period of time. In addition, the flat seat surface is not subjected to damage even if the stamper seated thereon is subjected to vibration when the molding material is injected to the mold cavity. Therefore, the mold requires much less maintenance and can be easily handled, so that the mold can be used quite efficiently, thereby improving the productivity of the molded compact discs.

DESCRIPTION OF THE PREFERRED EMBODIMENTS OF THE INVENTION

Figure 2:
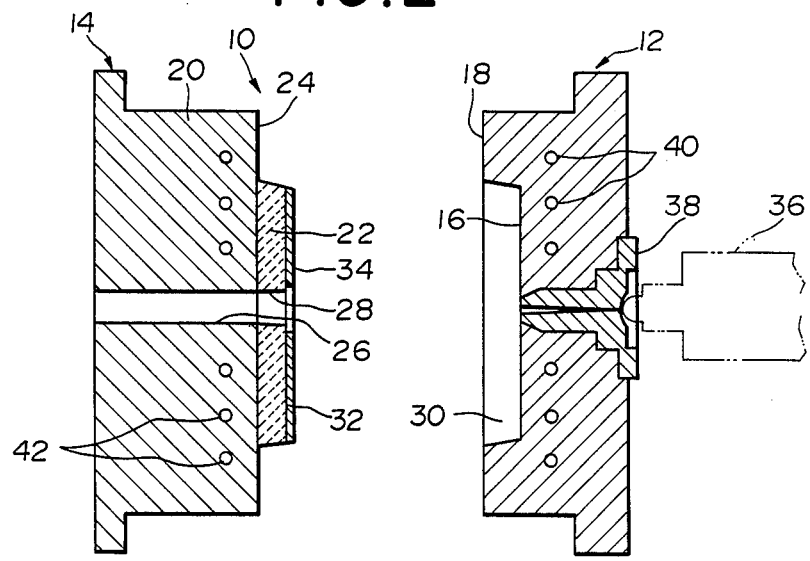
FIG. 2 is a mold provided in accordance with the present invention.

A mold 10 shown in FIG. 2 comprises a stationary mold member 12 and a movable mold member 14 movable toward and away from the stationary mold member 12 along associated guide rods (not shown). The stationary mold member 12 is made of steel and has a disc-shaped recess 16 formed in one flat face 18 thereof. The movable mold member 14 comprises a body 20 made of steel and a sintered ceramic member 22 of a disc-shape fixedly secured at one face by an adhesive to one flat face 24 of the body 20 facing the recess 16 of the stationary mold member 12. The ceramic member 22 may be fixedly secured to bolts to the body 20. The body 20 has an axial hole 26 formed therethrough, and the ceramic member 22 also has a central aperture 28 formed therethrough and disposed in alignment with the hole 26 of the body 20. When the movable mold member 14 is moved into engagement with the stationary mold member 12, the ceramic member 22 is fitted in the recess 16 with the faces 18 and 24 of the two mold members mated together, so that a mold cavity 30 of a disc-shape is defined by the other flat face 32 of the ceramic member 22 and the surface defining the recess 16 of the stationary mold member 12. Thus, the surface defining the recess 16 defines a cavity surface, and the flat face 32 of the ceramic member 22 also defines a cavity surface.

The flat face 32 of the sintered ceramic member 22 facing the recess 16 of the stationary mold member 12 serves as a seat surface on which a thin disc-shaped stamper 34 with a central aperture is seated at one face thereof. The stamper 34 is detachably secured to the seat surface 32 of the ceramic member 22 by a bolt (not shown) passing through the aperture 28 and the hole 26 and a nut (not shown) threaded onto a distal end of the bolt. In this condition, a molten molding resin is injected into the mold cavity 30 from a molding injection machine 36 via a nozzle 38 mounted on the stationary mold member 12. A plurality of elongated holes 40 are formed in the stationery mold member 12, and a plurality of elongated holes 42 are formed in the body 20 of the movable mold member 14. Cooling water is passed through these holes 40 and 42 during the molding operation to maintain the temperature of the mold 10 at predetermined temperatures.

The sintered ceramic member 22 is made of a ceramic material having Rockwell hardness (A-Scale) of not less than 90. If Rockwell hardness of the ceramic material is less than 90, the flat seat surface 32 of the ceramic member 22 may be subjected to damage when a stamper-exchanging jig or the like hits on the seat surface 32 and when it is subjected to abrasion by a cleaning means.

Preferably, the apparent density of the sintered ceramic material, the density of which is defined by the weight of the ceramic member 22 divided by its volume, should be not less than 85 % of the theoretical density the ceramic material. In this case, if the ceramic member 22 is made, for example, of silicon carbide, it has a sintered density of not less than 2.74 g/cm$^3$. More preferably, the sintered density of the ceramic material should be not less than 93 % of the theoretical density, in which case the ceramic member 22 made of silicon carbide has a sintered density of not less than 3.03 g/cm$^3$. As the sintered density becomes lower, the pores of the ceramic material becomes larger, so that a surface of the ceramic member 22 can not be finished to a satisfactory smoothness.

The ceramic member 22 can be made of a silicon carbide, silicon nitride, alumina, aluminum nitride, zirocnia, spinel, titanium carbide, boron carbide or the like. Among these ceramics materials, silicon carbide is most preferred since it has a high coefficient of thermal conductivity, so that the mold 10 can be cooled smoothly during the molding, thereby shortening the molding time to improve the shot cycle.

Either of $\alpha$ type and $\beta$ type silicon carbide can be used for the ceramic member 22. There are several methods of sintering silicon carbide. One method is to sinter silicon carbide under pressure, and aother method is to sinter silicon carbide under atmospheric pressure. A further method is to react silicon with carbon during the sintering. Any one of these three methods can be used to produce the sintered silicon carbide for the ceramic member 22. Such sintered silicon carbide is produced by adding a small amount of an assistant, such as carbon (C) and boron (B), to silicon carbide (SiC) in the form of fine powder and then sintering the powder. In addition, boron carbide ($B_4C$) or the like may be added as an assistant to the powder of silicon carbide to carry out the sintering of the ceramic material smoothly.

For producing the ceramic member 22 of silicon carbide, a binder and an assistant are added to powder of silicon carbide to form a mixture, and water is added to the mixture. Then, the mixture is adequately blended by a ball mill or the like to form a slurry. Then, the slurry is treated by a spray dryer or the like to form granular material. Then, the granular material is compacted by a press into a solidified solid body. Then, the solidified solid body is processed into a predtermined size and shape by a lathe or a mill and then is sintered to form a ceramic member 22. Finally, the ceramic member 22 is polished by diamond-lapping into a final form.

Preferably, the flat seat surface 32 of the ceramic member 22 thus produced should have a surface roughness of about 0.05 S to about 1.2 S. The use of a numerical value followed by a capital letter "S" denotes, according to the Japanese Industrial Standard (JIS), a surface roughness defined by the maximum peak-to-peak surface irregularity measured in um. If the surface roughness is more than 1.2 S, there is a possibility that such a coarse roughness may be transferred to the molded disc via the thin stamper 34. On the other hand, if the surface roughness of the flat seat surface 32 becomes unduly smaller, the contact between the stamper 34 and the flat seat surface 32 of the ceramic member 22 becomes excessively firm or tight. Due to a difference in thermal expansion coefficient between the stamper 34 and the ceramic member 22, fine wrinkles are liable to be produced on the stamper 34. The surface roughness of the flat seat surface 32a of the conventional mold 10a of Stavax must be not more than 0.01 S.

Since the flat seat surface 32 for detachably holding the stamper 34 thereon is made of the ceramic material, the flat seat surface 32, even when being stricken by a jig or the like, is not damaged or defomed to such an extent that this deformation is transferred to the surface of the molded optical disc. It is considered that the reason of this is that the flat seat surface 32 is so hard that it will not be vitally damaged, and that even if an indentation develops on the flat seat surface 32 upon the striking of the jig against it, the indentation is quite shallow and hence negligible, so that no deformation is transferred to the surface of the molded optical disc.

Figure 1:
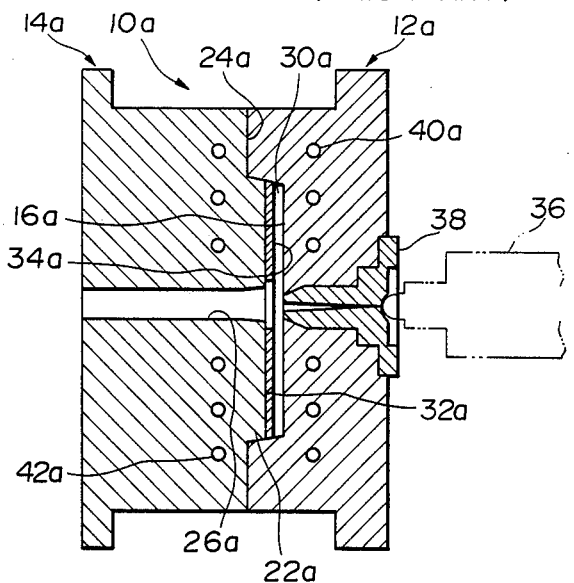
FIG. 1 is a cross-sectional view of a mold provided in accordance with the prior art.

In addition, the ceramic member 22 is relatively brittle as compared with metals, and therefore even if the flat seat surface 32 of the ceramic member 22 is hit by a jig and is indented slightly, the flat seat surface 32 will not be bulged around such an indentation, as is the case with a steel surface, because the seat surface 32 can not be plastically deformed. In such a case, with the conventional mold 10a shown in FIG. 1, a molding pressure in concentrated on that portion of the stamper 34 held in contact with such a bulged portion on the steel seat surface 32a during the molding operation, so that the molded optical disc is correspondingly deformed. On the other hand, with the mold 10 according to the present invention, no such a bulged portion will develop on the flat seat surface 32 of the ceramic member 22 even if it is damaged, and therefore no undue molding pressure is concentrated on that portion of the stamper 34 held in contact with the damaged portion on the flat seat surface 32, so that the stamper 34 will not be deformed, thereby ensuring the molding of optical discs of a required quality.

Another advantage that the flat seat surface 32 is made of the hard ceramic material is that the seat surface 32 will not be subjected to damage even if the stamper 34 is subjected to vibration when the molding resin is injected into the mold cavity 30.

The invention will not be illustrated by way of the following Example:

EXAMPLE

A mold similar to the mold 10 shown in FIG. 2 was prepared. For the purpose of simplicity, like reference numerals are used in this Example to denote corresponding parts. First, a stationary mold member 12 and a body 20 of a movable mold member 14 were made of steel (Stavax). A disc-shaped ceramic member 22 made of silicon carbide was prepared, the ceramic member 22 having a central aperture 28 therethrough and having an outer diameter of 140 mm, an inner diameter of 34 mm and a thickness of 12.7 mm. Then, the ceramic member 22 was fixedly secured in place to a face 24 of the body 20 by an epoxy adhesive. Then, a seat surface 32 of the ceramic member 22 was ground and subsequently polished by diamond-lapping into a highly flat surface having a surface roughness of 0.2 S, a parallelism of 0.002 and a flatness of 0.003.

The mold 10 thus prepared was mounted on an injection molding machine 36. Then, a stamper 34 having a thickness of 0.3 mm was mated with a secured to the flat seat surface 32 of the ceramic member 22, and a thousand of laser discs having an outer diameter of 120 mm, an inner diameter of 15 mm and a thickness of 1.2 mm were successively molded. During the molding operation, water of 80° C. was passed through the holes 40 and 42 of the stationary and movable mold members 12 and 14, and a molten molding material of polycarbonate resin of 300° C. was injected into the mold cavity 30.

After the molding operation, the laser discs were inspected, and no undesirable effects such as wrinkles were found. Thus, the mold 10 proved to be satisfactory.

Then, molding operations were carried out, exchanging stampers as was the case with the practical molding operation. It was found that the frequency of damage to the flat seat surface 32 was lower than that of damage to the flat seat surface 32a of the conventional mold 10a shown in FIG. 1 In addition, conventionally, 10 to 15 shots were necessary before the injection molding becomes stable, after one stamper is replaced by another. With the mold 10 incorporating the ceramic member 22, only three shots or so were necessary before the injection molding becomes stable. Thus, it takes much shorter time before the molding operation becomes stable.

While the mold according to the present invention has been specifically shown and described herein, the invention itself is not to be restricted to the exact showing of the drawings or the description thereof. For example, in the illustrated embodiment, although only the cavity surface defined by the flat seat surface 32 is made of the ceramic material, all the cavity surfaces may be made of the ceramic material. Also, although the cooling holes 42 are provided in the body 20 of the movable mold member 14, these holes may be formed in the ceramic member 22, in which case it is desirable to provide the body 20 and the ceramic member 22 with recesses and projections, respectively, so that the projections are fitted in the recesses fr holding the ceramic member 22 with respect to the body 20. With this arrangement, since the flat seat surface 32 is cooled more efficiently, the ceramic member 22 can be made of a ceramic material having a lower coefficient of thermal conductivity.

What is claimed is:

1. A mold for molding an optical disc comprising a first mold member having a first cavity surface and a second mold member movable relative to said first mold member and having a second cavity surface, said first and second cavity surfaces jointly providing a mold cavity when said first and second mold members are mated together, said second cavity surface having a flat seat surface detachably holding a disc-shaped thin stamper thereon when molding said optical disc, said flat seat surface being made of a sintered ceramic material having Rockwell hardness (A-Scale) of not less than 90.

2. A mold according to claim 1, in which said second mold member comprises a body and a separate ceramic member fixedly secured to said body, said separate ceramic member having said flat seat surface.

3. A mold according to claim 1, in which the density of said sintered ceramic material is not less than 85% of a theoretical density of said ceramic material.

4. A mold according to claim 1, in which said ceramic material is made of silicon carbide.

5. A mold according to claim 1, in which said flat seat surface has a surface roughness of about 0.05 S to 1.2 S according to Japanese Industrial Standard (JIS).

6. A mold for molding an optical disc comprising:
   (a) a first mold member having a first cavity surface;
   (b) a second mold member having a second cavity surface and movable relative to said first mold member so that said first and said second cavity surfaces jointly form a mold cavity when mated together, said second cavity surface having a flat seat surface being made of a sintered ceramic material having Rockwell hardness (A-Scale) of not less than 90; and
   (c) a disc-shaped thin stamper having a flat surface and an uneven surface on which information to be molded on said optical disc is patterned, said flat surface being in close adherence to said flat seat surface so that said uneven surface is in contact with said optical disc while molding it so as to mold said pattern on said optical disc.

7. A mold according to claim 2, in which said separate ceramic member is fixedly secured to said body by means of an adhesive.

8. A mold according to claim 1, in which said flat surface has a maximum peak-to-peak surface irregularity between 0.05 and 1.2 $\mu$m.

* * * * *